(12) United States Patent
He et al.

(10) Patent No.: US 9,300,439 B2
(45) Date of Patent: Mar. 29, 2016

(54) HARQ FAILURE INDICATION METHOD, HARQ FAILURE INDICATION DATA FRAME AND SERVICING NODE B THEREOF

(75) Inventors: Meifang He, Shenzhen (CN); Xiang Cheng, Shenzhen (CN); Yu Zhang, Shenzhen (CN)

(73) Assignee: ZTE CORPORATION (CN)

( * ) Notice: Subject to any disclaimer, the term of this patent is extended or adjusted under 35 U.S.C. 154(b) by 137 days.

(21) Appl. No.: 13/259,708

(22) PCT Filed: Jan. 6, 2010

(86) PCT No.: PCT/CN2010/070030
§ 371 (c)(1),
(2), (4) Date: Feb. 8, 2012

(87) PCT Pub. No.: WO2011/020307
PCT Pub. Date: Feb. 24, 2011

(65) Prior Publication Data
US 2012/0134276 A1 May 31, 2012

(30) Foreign Application Priority Data
Aug. 18, 2009 (CN) .......................... 2009 1 0166295

(51) Int. Cl.
*H04W 52/12* (2009.01)
*H04L 1/16* (2006.01)
*H04L 1/18* (2006.01)

(52) U.S. Cl.
CPC ............ *H04L 1/1607* (2013.01); *H04L 1/1671* (2013.01); *H04L 1/1822* (2013.01); *H04L 1/1848* (2013.01); *H04L 1/1854* (2013.01); *H04W 52/12* (2013.01); *H04L 1/1812* (2013.01)

(58) Field of Classification Search
USPC .................................................. 370/216, 242
See application file for complete search history.

(56) References Cited

U.S. PATENT DOCUMENTS

2006/0187844 A1* 8/2006 Chun et al. .................... 370/242
2008/0273454 A1* 11/2008 Malkamaki et al. .......... 370/216

(Continued)

FOREIGN PATENT DOCUMENTS

| CN | 101116279 | 1/2008 |
| CN | 101374040 | 2/2009 |
| JP | 2008529437 A | 7/2008 |

OTHER PUBLICATIONS

"Proposal on FP Networks for DC_HSUPA" 3GPP TSG RAN WG3 Meeting #64, San Francisco, USA, May 4-8, 2009, R3-091341, Source: Nokia Siemens Networks, Nokia, XP540341677.

(Continued)

*Primary Examiner* — Huy D Vu
*Assistant Examiner* — Bao G Nguyen
(74) *Attorney, Agent, or Firm* — Cantor Colburn LLP

(57) ABSTRACT

The present invention provides a Hybrid Automatic Repeat Request (HARQ) failure indication method, an HARQ failure indication data frame and a Serving Node B thereof. In the above method, when the decoding of the received Enhanced Dedicated Transport Channel (EDCH) data frame is unsuccessful and the condition of sending HARQ failure indication is satisfied currently, Serving Node B sends an HARQ failure indication data frame to the Service Radio Network Controller (SRNC). Wherein, a carrier identifier which indicates the carrier on which the HARQ failure happens is carried in the HARQ failure indication data frame. According to the present invention, when the SRNC receives the HARQ failure indication data frame, SRNC can perform Outer Loop Power Control (OLPC).

10 Claims, 14 Drawing Sheets

(56) References Cited

U.S. PATENT DOCUMENTS

2010/0296389 A1* 11/2010 Khandekar et al. ........... 370/216
2012/0002610 A1* 1/2012 Widegren et al. ............. 370/328

OTHER PUBLICATIONS

"Proposed principles for Dual-Cell HSUPA operation", 3GPP TSG-RAN WG3 #63bis, Seoul, South Korea, Mar. 23-26, 2009, R3-090838, Source: Ericsson, XP50341214.

"Universal Mobile Telecommunications Systems (UMTS); UTRAN Iur/Iub interface user plane protocol for DCH data streams", 3GPP TS 25.427 version 8.0.0 Release 8, ETSI TS 125 427 V8.0.0 (Oct. 2008), URL; http://www.etsi.org, XP14042540.

Szilveszter Nadas, "HSUPA Transport Network Congestion Control", Ericsson Research, Traffic Analysis and Network Performance Laboratory, 2008 IEEE, XP31405631.

* cited by examiner

HARQ FAILURE INDICATION METHOD, HARQ FAILURE INDICATION DATA FRAME AND SERVICING NODE B THEREOF

CROSS-REFERENCE TO RELATED APPLICATIONS

This is a national phase of International Patent Application No. PCT/CN2010/070030 filed Jan. 6, 2010, which in turn claims the priority benefit of Chinese Patent Application No. 200910166295.9 filed Aug. 18, 2009, the entire respective disclosures of which are incorporated herein by reference.

FIELD OF THE INVENTION

The present invention relates to the field of mobile communication, and in particular to a Hybrid Automatic Repeat Request (hereinafter referred to as HARQ) failure indication method, an HARQ failure indication data frame and a Serving Node B thereof.

BACKGROUND OF THE INVENTION

In an existing system, when there is data to transmit on the Iub port (an interface between the Serving Node B and the Service Radio Net Controller (hereinafter referred to as SRNC)) and the Iur port (an interface between SRNC and control RNC), in every transmission time interval, the data frame is transmitted from SRNC to Serving Node B for the downlink transmission, and the data frame is transmitted from Serving Node B to SRNC for the uplink transmission. The Enhanced Dedicated Transport Channel (hereinafter referred to as E-DCH) data frame is a type of data frame, which is used in the uplink direction and comprised by higher-layer signal indication. The E-DCH data frame is defined with two types of structure: Type 1 and Type 2. If Medium Access Control-enhanced sublayer Protocol Data Unit (hereinafter referred to as MAC-es PDU) is comprised, Type 1 structure is used; and if Medium Access control-improved sublayer Protocol Data Unit (hereinafter referred to as MAC-is PDU) is comprised, Type 2 structure is used.

FIG. 1A and FIG. 1B show the structures of the E-DCH data frame Type 1 and Type 2 respectively. As shown in FIG. 1A and FIG. 1B, both Type 1 and Type 2 comprise two parts: header and payload. The difference is the data unit type comprised. Each E-DCH comprises the following several fields.

1. Header Cyclic Redundancy Check (Hereinafter Referred to as CRC) Field

The "CRC check code" field is the result of the CRC applied to the remaining part of the header (i.e. from bit 0 of the first byte to bit 0 (comprised) of the last byte of the header (not comprising the Header CRC Cont four bits)) with the corresponding generator polynomials. The length of the "header CRC check code" field adapted to an E-DCH uplink data frame is 7 bits or 11 bits. The 7 bits are bit 7 to bit 1 of the first byte of the frame header of the E-DCH data frame, and the 11 bits further contain bits from bit 7 to bit 4 of the second byte besides of the bits from bit 7 to bit 1 of the first byte.

2. Frame Type Indicator

The "frame type indicator" field is used to indicate whether a frame is a data frame or a control frame. The length of the "frame type indicator" field is one bit and it is located in bit 0 of the first byte of the frame header in the E-DCH data frame. The E-DCH data frame is an uplink data frame, and therefore, as described above, its "frame type indicator" field is "0".

3. Frame Sequence Number (Hereinafter Referred to as FSN)

The "frame sequence number" field represents the FSN of an E-DCH data frame, and for each transmitted E-DCH data frame, it has to generate its own FSN. If the FSN is 4 bits, then it is calculated according to the following formula:

$$FSN=(FSN+1) \text{ modulo } 16.$$

The range of the FSN value is 0-15. The length of the "frame sequence number" field is 4 bits and it is located from bit 3 to bit 0 of the second byte of the frame header of the E-DCH data frame.

4. Number of Subframes

The "number of subframes" field indicates how many subframes are in a frame. Please note that a subframe comprises a header portion and a payload portion. The value range of the "number of subframes" field is 1-16, in which, the binary code of value 1 is "0000", and the binary code of value 16 is "1111". The length of the "number of subframes" field is 4 bits, and it is located from bit 3 to bit 0 of the third byte of the frame header of the E-DCH data frame.

5. Connection Frame Number

For E-DCH, the "connection frame number" field indicates a radio frame that the HARQ decodes data accurately. For E-DCH, this field is adapted to the purpose of re-ordering, and CFN (and subframe number) can be adapted to dynamic delay measurements. The value range is 0-255. The length of the "connection frame number" field is 8 bits and it is located from bit 7 to bit 0 of the fourth byte of the frame header of the E-DCH data frame.

6. Number of HARQ Retransmissions

The "number of HARQ retransmissions" field indicates the number of HARQ retransmissions for successfully decoding the payload, or as to the HARQ decoding failure situation, this field indicates the number of HARQ retransmissions that were used at the time when the HARQ decoding failure is detected. And the value of this field being 13 indicates that the actual retransmitted data is inappropriate to be used as the input of the outer loop power control. The value of this field being 15 indicates that the node B is incapable of calculating the number of HARQ retransmissions. The value range is 0-15. The length of the "number of HARQ retransmissions" field is 4 bits and it is located from bit 3 to bit 0 of the fifth byte of the frame header of the E-DCH data frame; the "number of HARQ retransmissions" field of the first subframe number is located from bit 6 to bit 3 of the fifth byte of the frame header of the E-DCH data frame; the "number of HARQ retransmissions" field of the second subframe number is located from bit 6 to bit 3 of the first byte of the frame header of the E-DCH data frame after the first MAC-e header. The location of the "number of HARQ retransmissions" fields of other subframe numbers in the frame header of the E-DCH data frame can be deduced in the same manner, till this subframe comprises the number of HARQ retransmissions of all the MAC-es PDUs.

7. Subframe Number

The "subframe number" field indicates the subframe number in which the payload is received. Except for the purpose of re-ordering, the subframe number (and control frame number) may be used as dynamic delay measurement. The value range of the "subframe number" field is 0-4 and the length is 3 bits; the first subframe number is located from the bit 2 to the bit 0 of the fifth byte of the frame header of the E-DCH data frame; the second subframe number is located from the bit 2 to the bit 0 of the first byte after the first MAC-e or MAC-i header of the frame header of the E-DCH data frame; and other subframe numbers are located from the bit 2 to the bit 0 of the first byte after the previous MAC-e or MAC-i header of the frame header of the E-DCH data frame, till all the subframe numbers are comprised.

8. Spare Extension

The "spare extension" field indicates the location where new Information Elements (IEs) can in the future be added in a backward compatible way. The length of this field is 0-32 bytes.

9. Payload CRC

The "payload CRC" field is the CRC check of the payload. It is the result of the CRC applied to the remaining portion of the payload, that is, from the bit 7 of the first byte of the payload to the bit 0 of the payload before the payload CRC. The length is 16 bits.

If the decoding of the E-DCH payload is successful, the E-DCH data frame is written in the above mentioned format, and sent by Serving Node B to SRNC.

If the decoding of the E-DCH payload is unsuccessful and one of the following conditions is satisfied, Serving Node B will send a HARQ failure indication to SRNC (Non-serving Node B will not send a HARQ failure indication).

Condition 1: a MAC-e or MAC-i protocol data unit for a HARQ process has not yet been successfully decoded and the Retransmission Sequence Number (hereinafter referred to as RSN) indicates a new MAC-e or MAC-i protocol data unit transmitted for the same HARQ process, and the HARQ retransmission number that had already occurred was equal or higher than the lowest of the maximum HARQ retransmissions values for the terminal's configured MAC-d flows.

Condition 2: a MAC-e or MAC-i for a HARQ process has not yet been successfully decoded, and the maximum retransmissions for the MAC-d flow with the highest maximum HARQ retransmissions value valid for the terminal connection have occurred, or should have occurred in case the HARQ related outband signaling (for example RSN) on the E-DPCCH could not be decoded.

Condition 3: an MAC-e or MAC-i for an HARQ process has not yet been successfully decoded when MAC-e or MAC-i Reset is performed in the terminal. The Node B knows the timing of the MAC-e or MAC-i Reset in the terminal via higher layer.

The HARQ failure indication is only sent at one transmission bearer. Serving Node B may select any transmission bearer associated with the terminal related to this HARQ failure indication.

If the HARQ failure is indicated in the user data frame, it is called HARQ failure indication data frame. As shown in FIG. 2A and FIG. 2B, the detailed configuration of it is as follows.

1. When a failure is detected, the connection frame number and the subframe number Information Elements values will reflect this time.

2. Type 1: as shown in FIG. 2A, the number of MAC-es protocol data units is set to 0. As a consequence, there are no Information Elements of DDI and N in the header. In order to have the octet aligned structure, 4 bits padding is used after number of MAC-es protocol data unit Information Element, and there are no MAC-es protocol data units Information Elements in the payload part of the data frame related to HARQ failure.

3. Type 2: as shown in FIG. 2B, the number of MAC-is protocol data units is set to 0. As a consequence, there are no Information Elements of MAC-is protocol data descriptor in the header. There are no MAC-is protocol data units Information Elements in the payload part of the data frame related to HARQ failure.

4. The Number of HARQ retransmissions Information Element is set to be the Number of HARQ retransmissions occurred when the failure was detected. The coding method is the same as for a correctly decoded payload described above.

SRNC decodes the Number of HARQ retransmissions from the received correctly-decoded E-DCH data fame header as the input of Outer Loop Power Control, or decodes the Number of HARQ retransmissions from the E-DCH data fame header of HARQ failure indication as the input of Outer Loop Power Control. If the Signal Interference Ratio (hereinafter referred to as SIR) of Outer Loop Power Control is modified, SRNC comprises new SIR target in the Outer Loop Power Control frame and sends it to Serving Node B. The Inner Loop Power Control function located at Serving Node B will use the new SIR target to perform power emission of the control terminal, and therefore minimize interference and maintain quality of connection.

Now, Dual-carrier technology is gradually introduced into the existing system. In the system which adopts Dual-carrier technology, if the above mentioned HARQ failure indication is used, the following problems may occur:

Serving Node B may receive MAC-es PDUs or MAC-is PDUs sent from two carriers from the air interface, and the decoding of data on both carriers may fail at the same time, or one succeeds and the other fails; while the HARQ failure indication in the existing system only regards the decoding failure of MAC-es PDUs or MAC-is PDUs on one carrier, without indicating the carrier property of HARQ failure indication. If one of the MAC-e PDU or MAC-i PDU received by Serving Node B from two carriers from the air interface fails, or both fail, then enter one HARQ failure indication data frame, that is, the decoding failure of MAC-es PDUs or MAC-is PDUs on two carriers share one HARQ failure indication data frame. However, Outer Loop Power Control (hereinafter referred to as OLPC) is calculated based on the HARQ retransmission data of E-DCH protocol data frame header or the HARQ retransmission data of HARQ failure indication frame header. Using current HARQ failure indication data frame can not inform which carrier the Number of HARQ retransmissions belong to, so SRNC can not know the retransmission times of the data flow on each carrier, and therefore can not perform OLPC.

SUMMARY OF THE INVENTION

In view of that the above mentioned, the present invention provides an improved HARQ failure indication solution which is used to solve the problem that SRNC can not perform OLPC for it cannot learn the retransmission times of the data flow on each carrier in a Dual-carrier system.

According to one aspect of the present invention, an HARQ failure indication method is provided, which is used to indicate HARQ failure in a Dual-carrier system.

The HARQ failure indication method according to the present invention comprises: when the decoding of the received E-DCH data frame is unsuccessful and the condition of sending HARQ failure indication is satisfied currently, a Serving Node B sending an HARQ failure indication data frame to SRNC, wherein a carrier identifier which indicates the carrier on which the HARQ failure happens is carried in the HARQ failure indication data frame.

According to another aspect of the present invention, an HARQ failure indication data frame is provided.

The HARQ failure indication data frame according to the present invention is Type 1 or Type 2 of E-DCH data frame, and the HARQ failure indication data frame comprises a carrier indicator field which indicates the carrier on which the HARQ failure happens.

Preferably, the above mentioned carrier indicator field is located at any spare field of the HARQ failure indication data frame or at a spare extension field of the HARQ failure indication data frame.

According to yet another aspect of the present invention, a receiving method of the HARQ failure indication is provided.

The receiving method of the HARQ failure indication according to the present invention comprises: SRNC receiving the HARQ failure indication data frame sent from Serving Node B, wherein a carrier identifier which indicates the carrier on which the HARQ failure happens is carried in the HARQ failure indication data frame; SRNC acquires the above mentioned carrier identifier, and determines the carrier on which the HARQ failure happens according to the carrier identifier.

According to a still further aspect of the present invention, a Serving Node B is provided.

The Serving Node B according to the present invention comprises: a Receiving Module, a Decoding Module, a Determination module, and a Sending Module, wherein the Receiving Module is adapted to receive E-DCH data frame; the Decoding Module is adapted to decode the E-DCH data frame received by the Receiving Module, and trigger the Determination module when the decoding is unsuccessful; the Determination module is adapted to determine weather the predetermined condition of sending an HARQ failure indication is satisfied currently; and the Sending Module is adapted to send the HARQ failure indication data frame to SRNC when the Determination module determines that the condition of sending an HARQ failure indication is satisfied, wherein a carrier identifier which indicates the carrier on which the HARQ failure happens is carried in the HARQ failure indication data frame.

According to at least one of the above mentioned solutions, through the carrier identifier which indicates the carrier on which the HARQ failure happens carried in the HARQ failure indication data frame, SRNC can learn the carrier on which the HARQ failure happens when receiving the HARQ failure indication data frame, and therefore can perform OLPC.

Other features and advantages of the present invention will be illustrated in the specification hereinafter, and will partly become obvious from the specification, or can be understood by the implementation of this invention. The objects and other advantages of the present invention are achieved and obtained through the specification, claims, and the structures specifically indicated in the drawings.

BRIEF DESCRIPTION OF THE DRAWINGS

The Drawings are used for providing further understanding of the present invention, and shall constitute a part of the present invention. They are used for providing explanation for this invention in conjunction with the embodiments of the present invention and shall not constitute limitations for this invention. In the Drawings.

DETAILED DESCRIPTION OF THE EMBODIMENTS

Functional Overview

As described above, in the system which adopts the Dual-carrier technology, if the above mentioned HARQ failure indication is used, SRNC can not learn the repeat times of the data flow on each carrier, resulting in that SRNC can not perform OLPC. With regard to that problem, the embodiments of the present invention provide an improved HARQ failure indication solution. In the embodiments of the present invention, when the decoding of the E-DCH data frame is unsuccessful, Serving Node B determines whether the condition of sending an HARQ failure indication is currently satisfied, and if Yes, Serving Node B sends an HARQ failure indication data frame to SRNC. The HARQ failure indication data frame carries a carrier identifier which indicates the carrier on which the HARQ failure happens. When receiving the HARQ failure indication data frame, SRNC can determine the carrier on which the HARQ failure happens according to the carrier identifier.

In case of no conflicts, the embodiments of the present Application and the features of the embodiments can be combined with each other.

Hereinafter, the preferred embodiments of the present invention will be illustrated with reference to the drawings. It should be understood that, the preferred embodiments herein are only used to clarify and explain, not to limit the present invention.

According the embodiments of the present invention, an HARQ failure indication data frame is first provided.

The structure type of the HARQ failure indication data frame according the embodiments of the present invention can be either E-DCH data frame Type 1, or E-DCH data frame Type 2.

What the HARQ failure indication data frame according to the embodiments of the present invention differs from the HARQ failure indication data frame in the existing single carrier technology is that: a carrier indicator field which indicates the HARQ failure is added to the HARQ failure indication data frame according to the embodiments of the present invention.

Figure 1A:
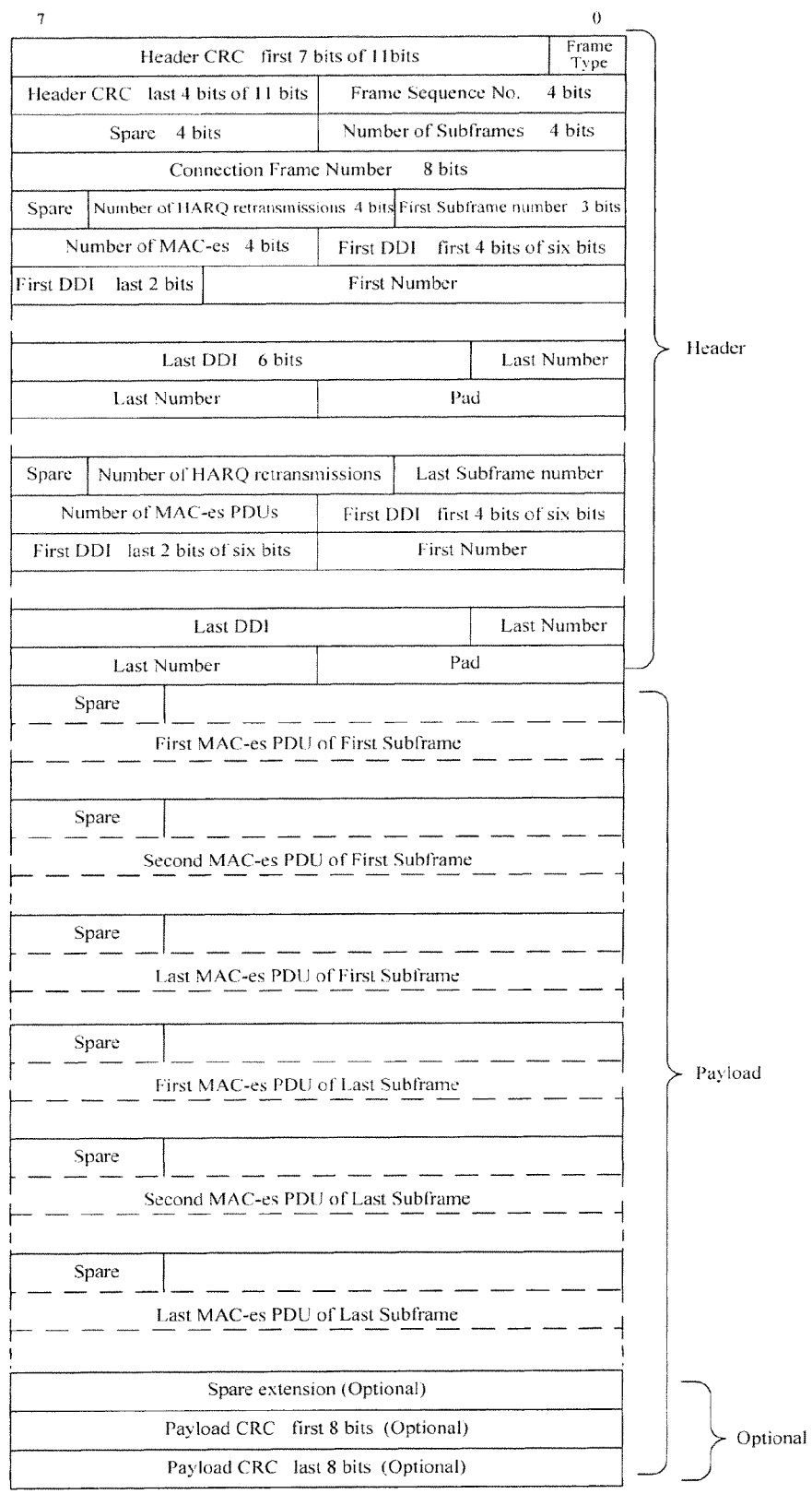
FIG. 1A is a format diagram of E-DCH uplink data frame Type 1 in the existing technology.
Figure 1B:
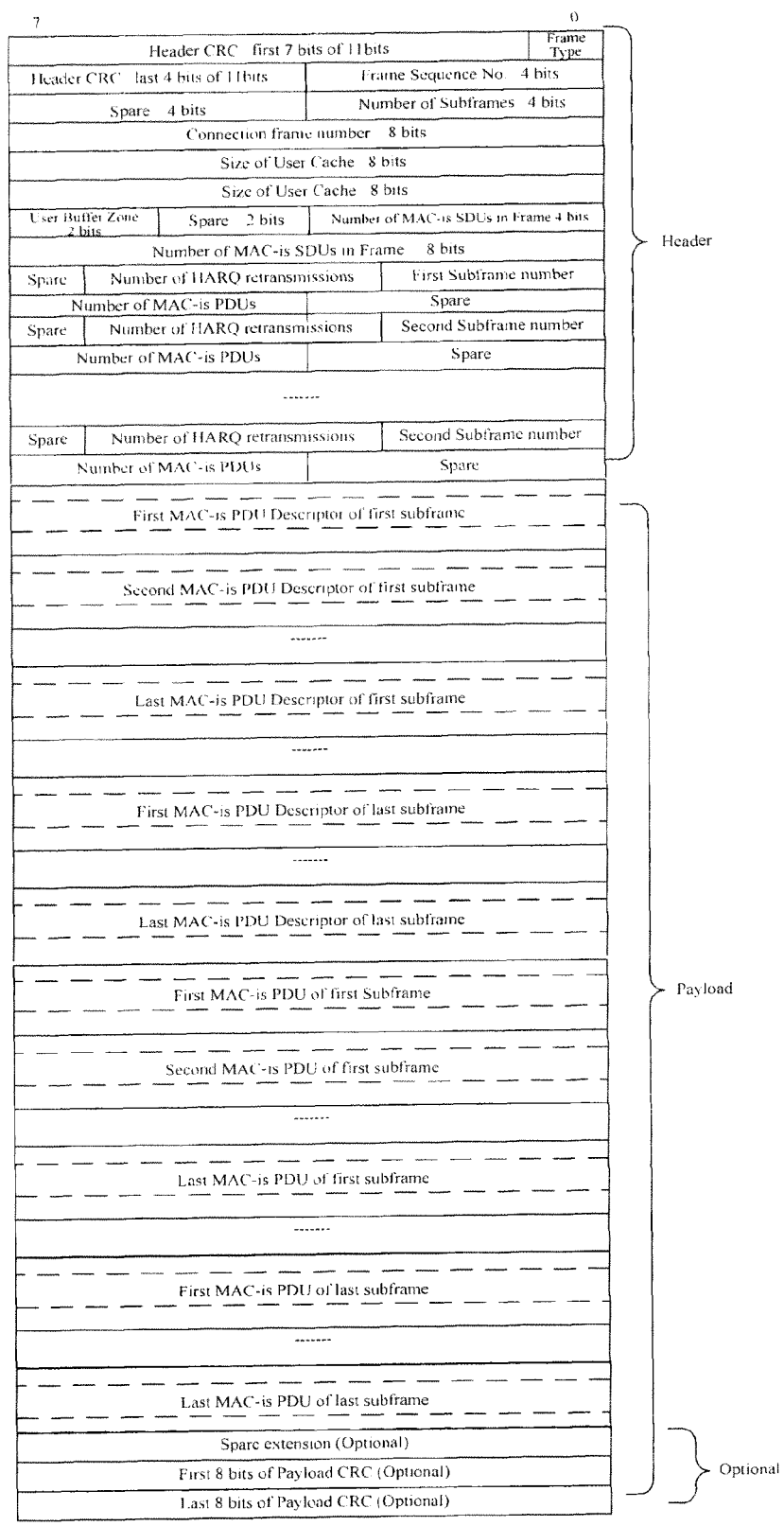
FIG. 1B is a format diagram of E-DCH uplink data frame Type 2 in the existing technology.
Figure 2A:
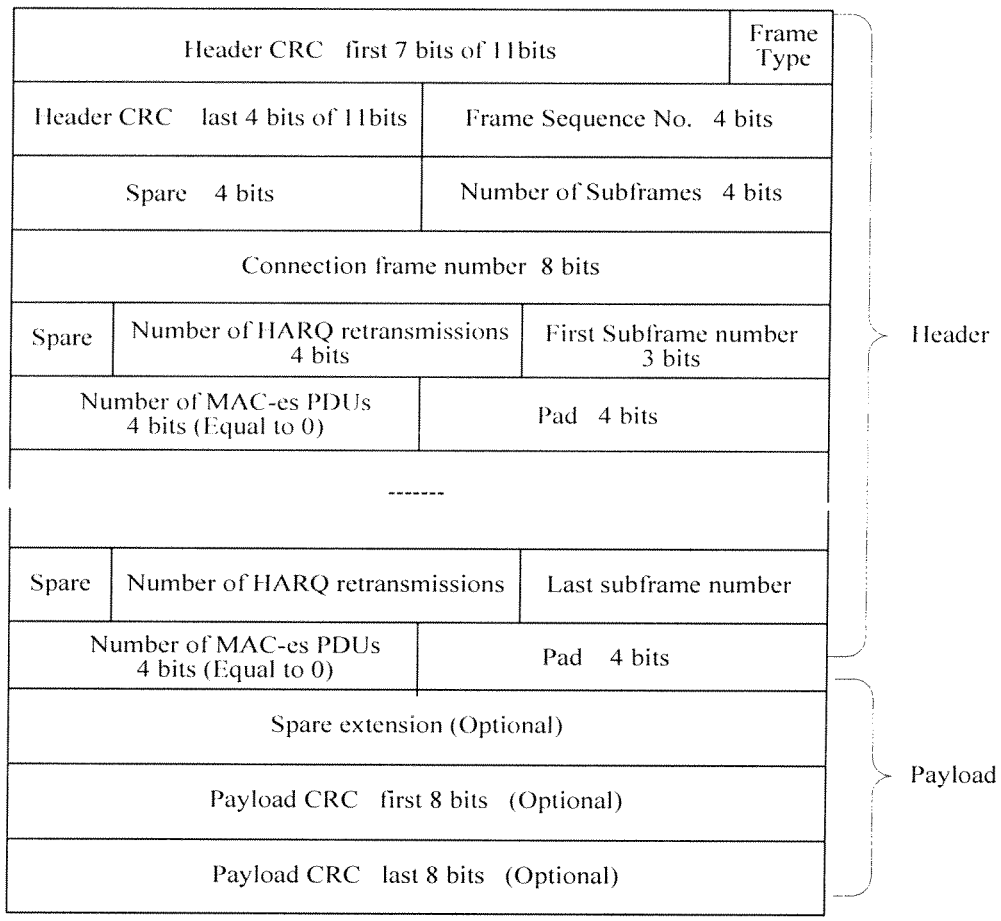
FIG. 2A is a schematic diagram of the HARQ failure indication data format of Type 1 in the existing technology.
Figure 2B:
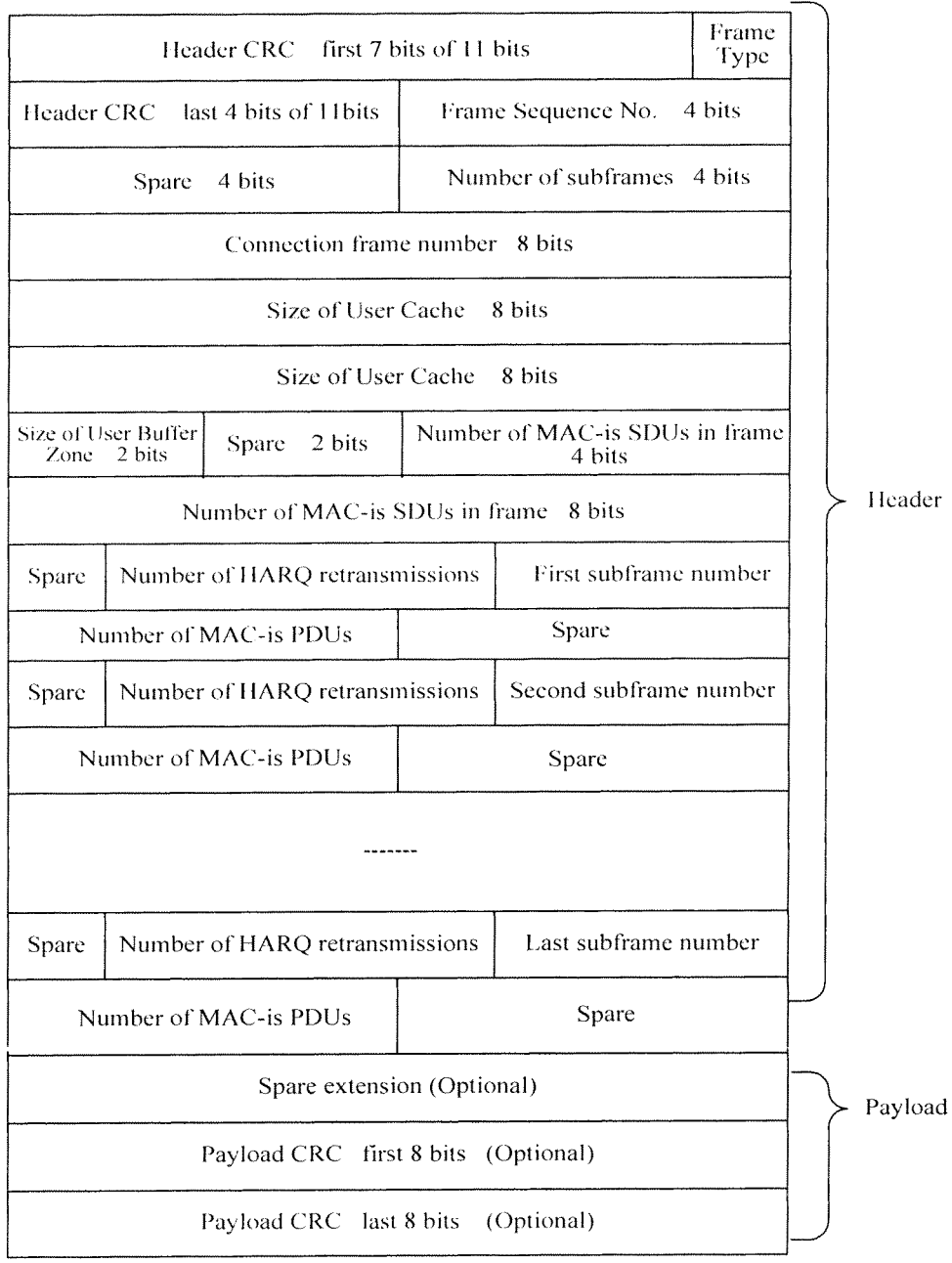
FIG. 2B is a schematic diagram of the HARQ failure indication data format of Type 2 in the existing technology.

Preferably, the carrier indicator field which indicates the carrier on which the HARQ failure happens can be located at any spare field of the HARQ failure indication data frame. That is, one or more bits in one spare field of the existing HARQ failure indication data frame (as shown in FIG. 2A or FIG. 2B) can be changed into the carrier indicator field. Or, it can be also located at the spare extension field of the HARQ failure indication data frame. That is, one or more bits in one spare extension field of the existing HARQ failure indication data frame (as shown in FIG. 2A or FIG. 2B) can be changed into the carrier indicator field, and assign the other bits of the spare extension field to a new spare field.

FIG. 3 to FIG. 6 are several specific embodiments of the HARQ failure indication data frame according the embodiments of the present invention. The several embodiments will be described respectively hereinafter.

Embodiment One

Figure 3:
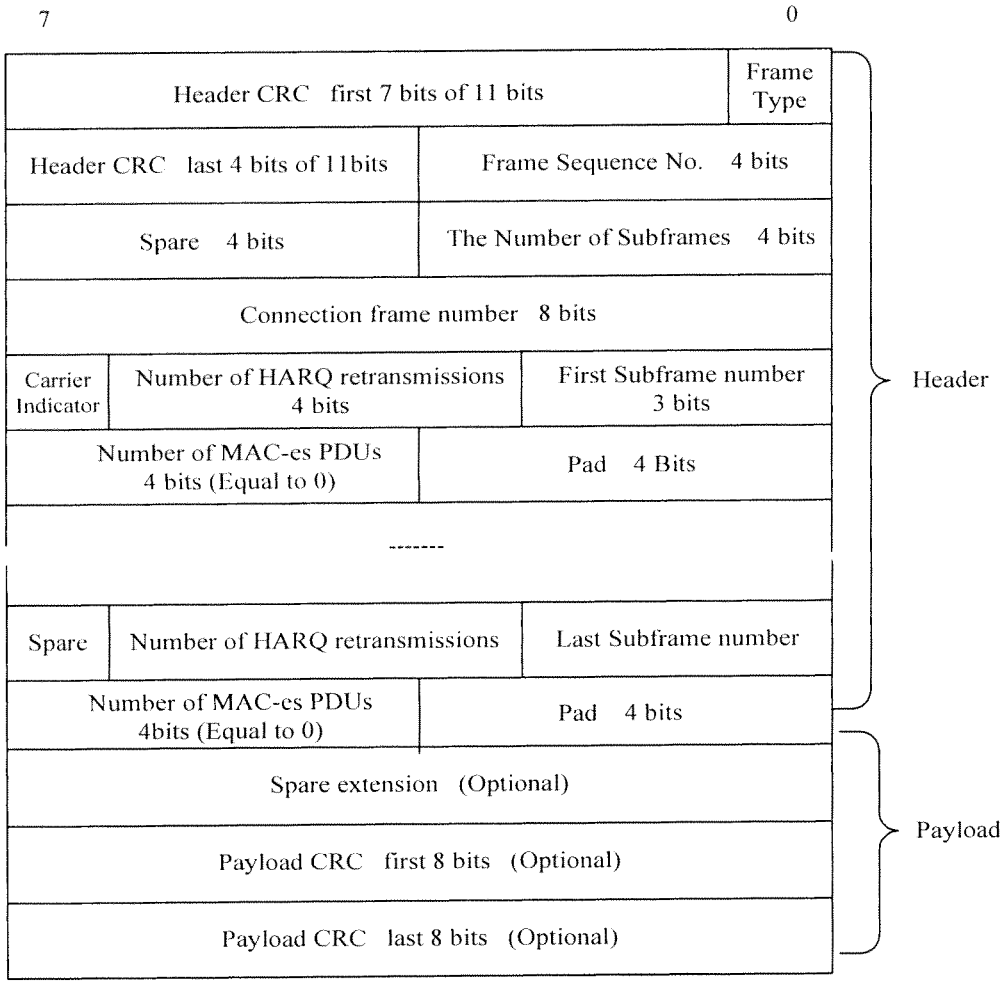
FIG. 3 is the structure diagram of the HARQ failure indication data frame in Embodiment One.

The embodiment provides a structure of the HARQ failure indication data frame of MAC-es decoding failure. FIG. 3 is the structure diagram of the HARQ failure indication data frame in the present embodiment;

As shown in FIG. 3, in the present embodiment, one bit in one spare field of the existing HARQ failure indication data frame of MAC-es decoding failure is changed into a carrier indicator field.

Specifically, the correspondence between the mapped field value and the primary/secondary carriers of the carrier indicator field can be as shown in Table 1.

TABLE 1

| Coding Value of the Carrier Indicator Field | Logic Meaning |
| --- | --- |
| 0 | Primary Carrier in the Dual-carrier |
| 1 | Secondary Carrier in the Dual-carrier |

In addition, the HARQ failure indication data frame of the Embodiment also comprises other fields, specifically, as shown in FIG. 3, mainly comprising: connection frame number field, subframe number field, the field of number of MAC-es protocol data units or the field of number of MAC-is protocol data units, and Number of HARQ retransmissions field. These fields respectively represent the connection frame number, the subframe number, the number of MAC-es protocol data units or the number of MAC-is protocol data units, and the Number of HARQ retransmissions of the carrier indicated by the carrier indicator field.

Embodiment Two

Figure 4:
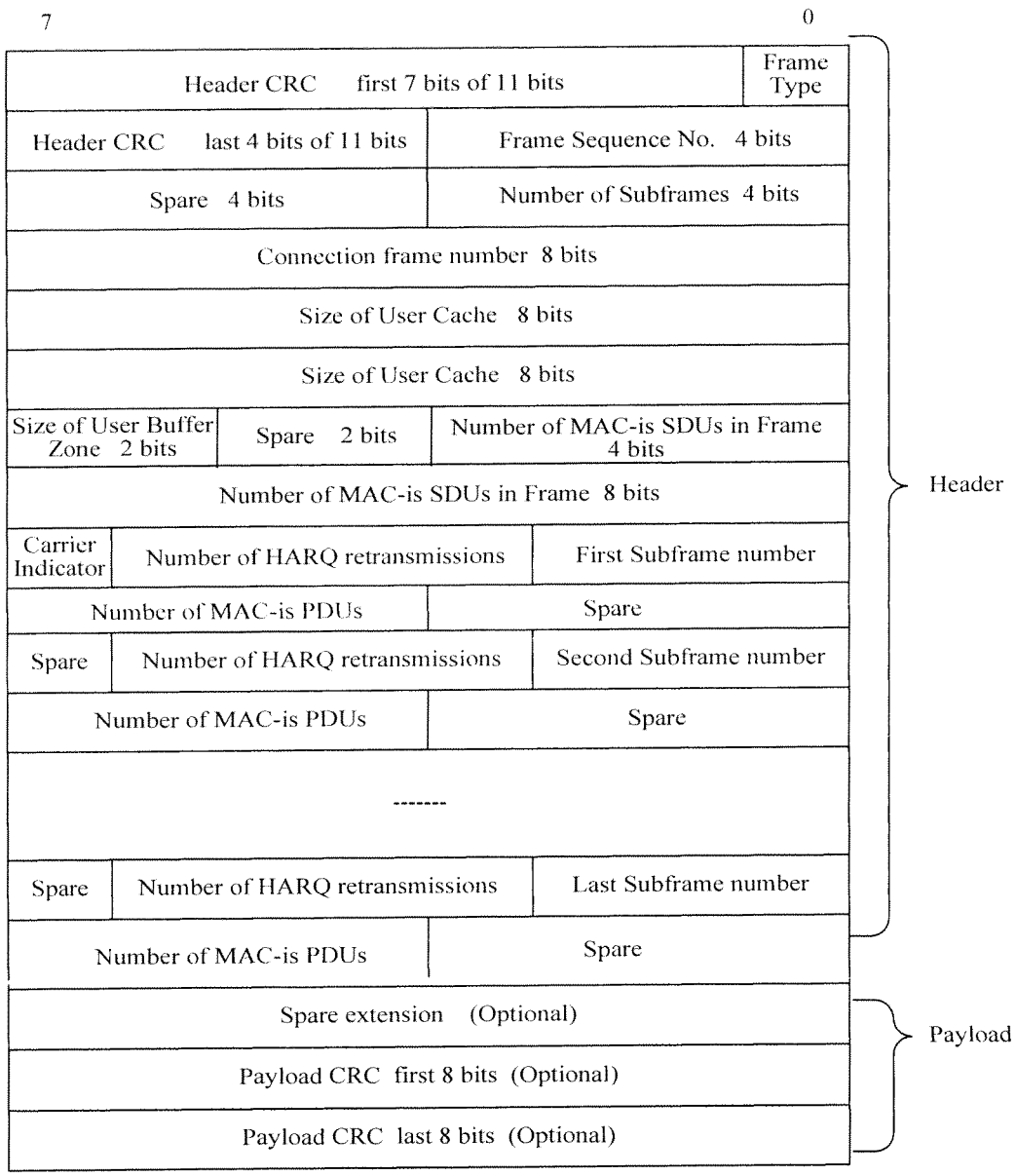
FIG. 4 is the structure diagram of the HARQ failure indication data frame in Embodiment Two.

The present embodiment provides an HARQ failure indication data frame of MAC-es decoding failure. FIG. 4 is the structure diagram of the HARQ failure indication data frame in the present embodiment.

As shown in FIG. 4, in the Embodiment, one bit in one spare extension field of the existing HARQ failure indication data frame of MAC-es decoding failure is changed into a carrier indicator field, and other bits of the spare extension field are assigned to a new spare field.

Specifically, in the Embodiment, the correspondence between the mapped field value and the primary/secondary carriers of the carrier indicator field can also be as shown in Table 1.

In the present embodiment, the Number of HARQ retransmissions field of the HARQ retransmission failure data frame indicates the Number of HARQ retransmissions corresponding to the carrier indicated by the carrier indicator field at the time of HARQ failure indication. And the meaning of other fields of the HARQ failure indication data frame (such as connection frame number field, subframe number field, and the field of number of MAC-es protocol data units or the field of number of MAC-is protocol data units) are similar to that of each corresponding field in the existing technology, which will not be repeated herein.

Embodiment Three

Figure 5:
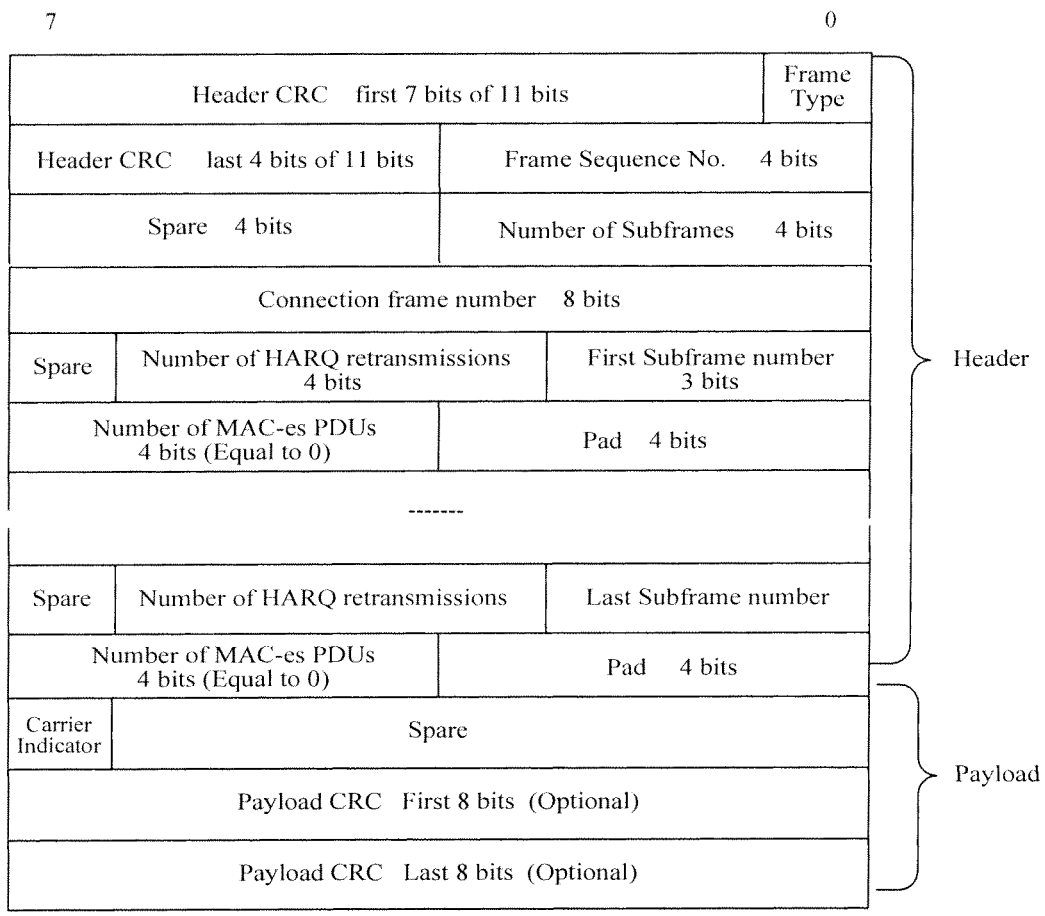
FIG. 5 is the structure diagram of the HARQ failure indication data frame in Embodiment Three.

The present embodiment provides the structure for an HARQ failure indication data frame of MAC-is decoding failure. FIG. 5 is the structure diagram of the HARQ failure indication data frame in the present embodiment.

As shown in FIG. 5, in the present embodiment, one bit in one spare field of the existing HARQ failure indication data frame of MAC-is decoding failure is changed into a carrier indicator field, and the field is used for indicating the carrier on which the HARQ failure happens. Specifically, the correspondence between the mapped field value and the primary/secondary carriers of the carrier indicator field can also be as shown in Table 1.

As shown in FIG. 5, the HARQ failure indication data frame of the Embodiment can still comprise other fields, such as: connection frame number field, subframe number field, the field of number of MAC-es protocol data units or the field of number of MAC-is protocol data units, and Number of HARQ retransmissions field, which respectively represent the connection frame number, the subframe number, the number of MAC-es protocol data units or the number of MAC-is protocol data units, the Number of HARQ retransmissions of the carrier indicated by the carrier indicator field.

Embodiment Four

Figure 6:
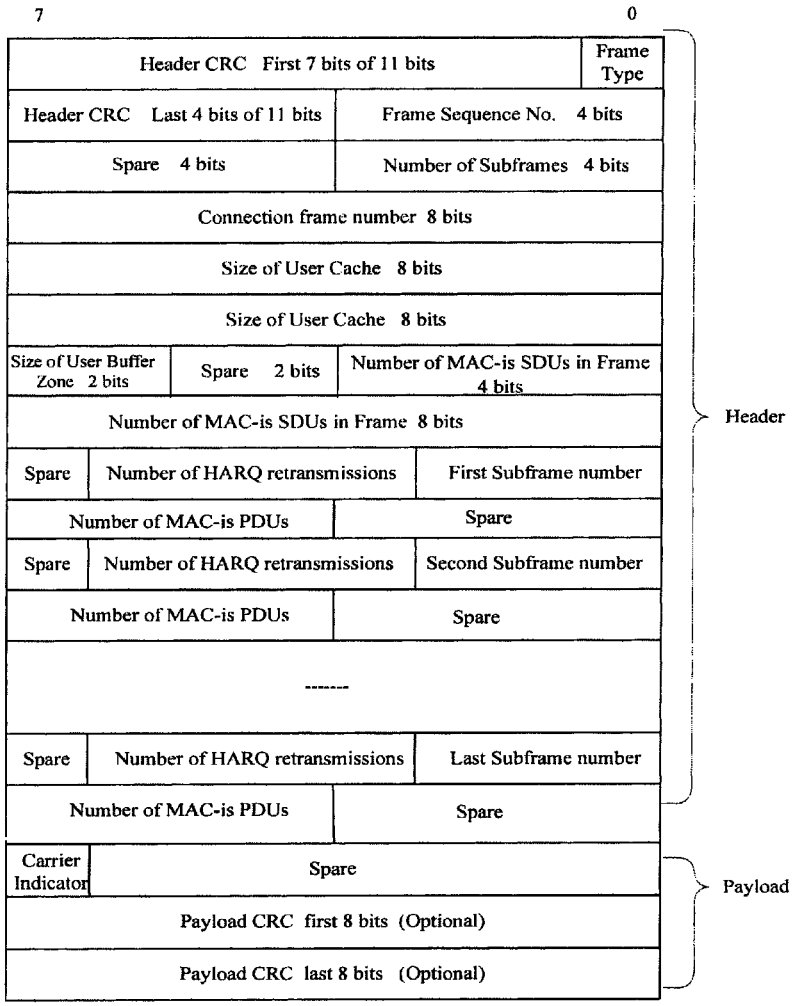
FIG. 6 is the structure diagram of the HARQ failure indication data frame in Embodiment Four.

The present embodiment provides the structure for an HARQ failure indication data frame of MAC-is decoding failure. FIG. 6 is the structure diagram of the HARQ failure indication data frame according to the present embodiment.

As shown in FIG. 6, in the present embodiment, one bit in one spare extension field of the existing HARQ failure indication data frame of MAC-is decoding failure is changed into a carrier indicator field, and other bits in the spare extension field is assigned to a new spare field. Specifically, the correspondence between the mapped field value and the primary/secondary carriers of the carrier indicator field can be as shown in Table 1.

In addition, as shown in FIG. 6, the HARQ failure indication data frame of the Embodiment can also comprise other fields, such as the connection frame number field, the subframe number field, the field of number of MAC-es protocol data units or the field of number of MAC-is protocol data units, and the Number of HARQ retransmissions field, which are respectively used to represent the connection frame number, the subframe number, the number of MAC-es protocol data units or the number of MAC-is protocol data units, and the Number of HARQ retransmissions on the carrier indicated by the carrier indicator field.

According to the embodiments of the present invention, an HARQ failure indication method is also provided, which is used to indicate HARQ failure in the Dual-carrier system.

Figure 7:
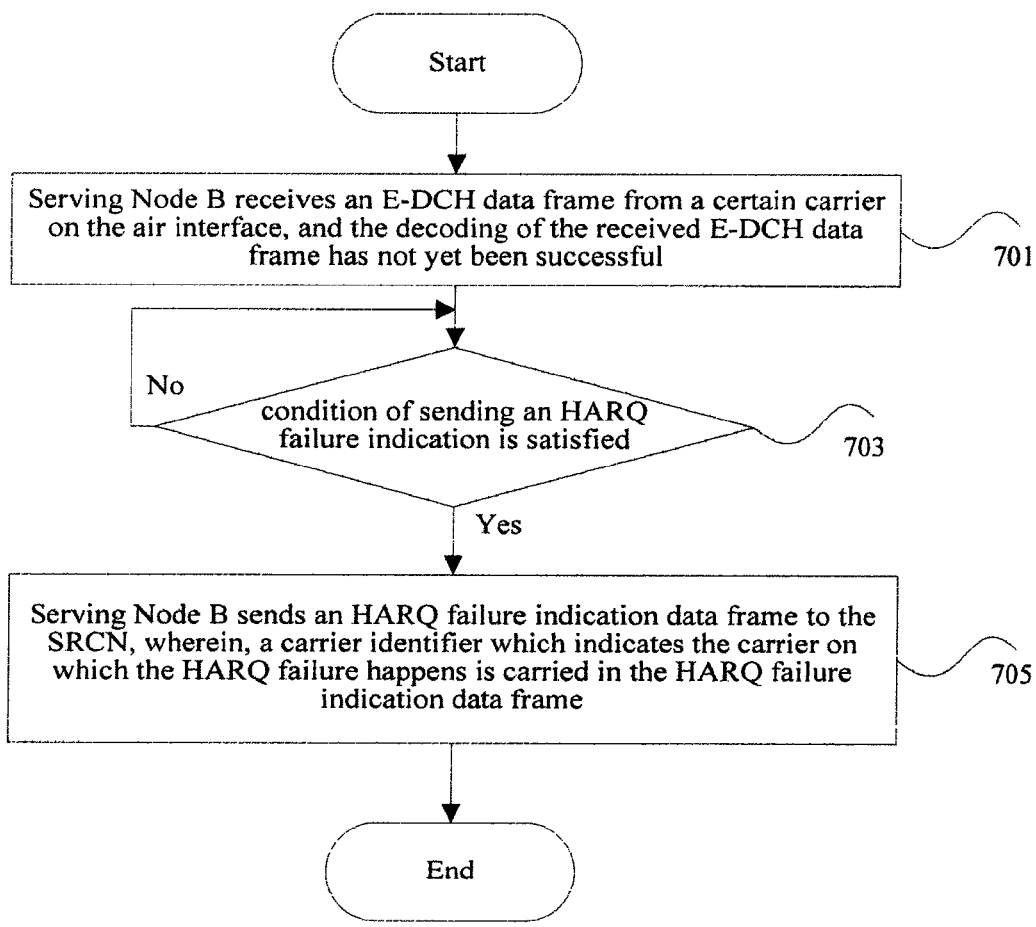
FIG. 7 is a flow chart of the HARQ failure indication method according to the embodiments of the present invention.

FIG. 7 is a flow chart of the HARQ failure indication method according to the embodiments of the present invention. As shown in FIG. 7, the HARQ failure indication method according to the embodiments of the present invention mainly comprises the following Steps.

Step S701: Serving Node B receives an E-DCH data frame from a certain carrier on the air interface, and the decoding of the received E-DCH data frame has not yet been successful.

Step S703: Serving Node B determines whether the condition of sending an HARQ failure indication is satisfied currently, and if Yes, execute Step S705; or else, continue determining.

Specifically, the condition of sending an HARQ failure indication can comprise one of the three following conditions.

Condition 1: an MAC-e or MAC-i protocol data unit for an HARQ process of a certain carrier has not yet been successfully decoded and the Retransmission Sequence Number (hereinafter referred to as RSN) indicates a new MAC-e or MAC-i protocol data unit transmitted for the same HARQ process, and the HARQ retransmission number that had already occurred was equal or higher than the lowest of the maximum HARQ retransmissions values for the terminal's configured MAC-d flows.

Condition 2: an MAC-e or MAC-i for an HARQ process on a certain carrier has not yet been successfully decoded, and the maximum retransmissions for the MAC-d flow with the highest maximum HARQ retransmissions value valid for the terminal connection have occurred, or should have occurred in case the HARQ related outband signaling (for example RSN) on the E-DPCCH of a certain carrier could not be decoded.

Condition 3: an MAC-e or MAC-i for an HARQ process on a certain carrier has not yet been successfully decoded when MAC-e or MAC-i Reset is performed in the terminal. The Node B knows the timing of the MAC-e or MAC-i Reset in the terminal via higher layer.

Step S705: Serving Node B sends an HARQ failure indication data frame to SRN, wherein, the HARQ failure indication data frame carries a carrier identifier which indicates the carrier on which the HARQ failure happens (that is, the carrier which receives the E-DCH data frame in Step S701).

In specific implementation, Serving Node B can carry the above mentioned carrier identifier in the carrier indicator field of the HARQ failure indication data frame. Specifically, the carrier indicator field can be located at any spare field of the HARQ failure indication data frame or at the spare extension of the HARQ failure indication data frame.

Specifically, the structure type of the HARQ failure indication data frame can be either E-DCH data frame Type 1, or E-DCH data frame Type 2, and the above mentioned structure of the HARQ failure indication data frame according to the embodiments of the present invention can be adopted. The details are described above, and will not be repeated herein.

After receiving the above mentioned HARQ failure indication data frame sent from Serving Node B, SRNC analyzes the carrier identifier from the carrier indicator field of this frame, and then analyzes the connection frame number from the connection frame field of number of this frame, acquiring it as the connection frame number of the carrier indicated by the carrier identifier. And, SRNC analyzes the subframe number from the subframe field of number of this frame, acquiring it as the subframe number of the carrier indicated by the carrier identifier. Moreover, SRNC can also analyze the Number of HARQ retransmissions from the Number of HARQ retransmissions field of this frame, acquiring it as the Number of HARQ retransmissions of the carrier indicated by the carrier identifier at the moment of HARQ failure represented by the connection frame number and the subframe number.

Figure 8:
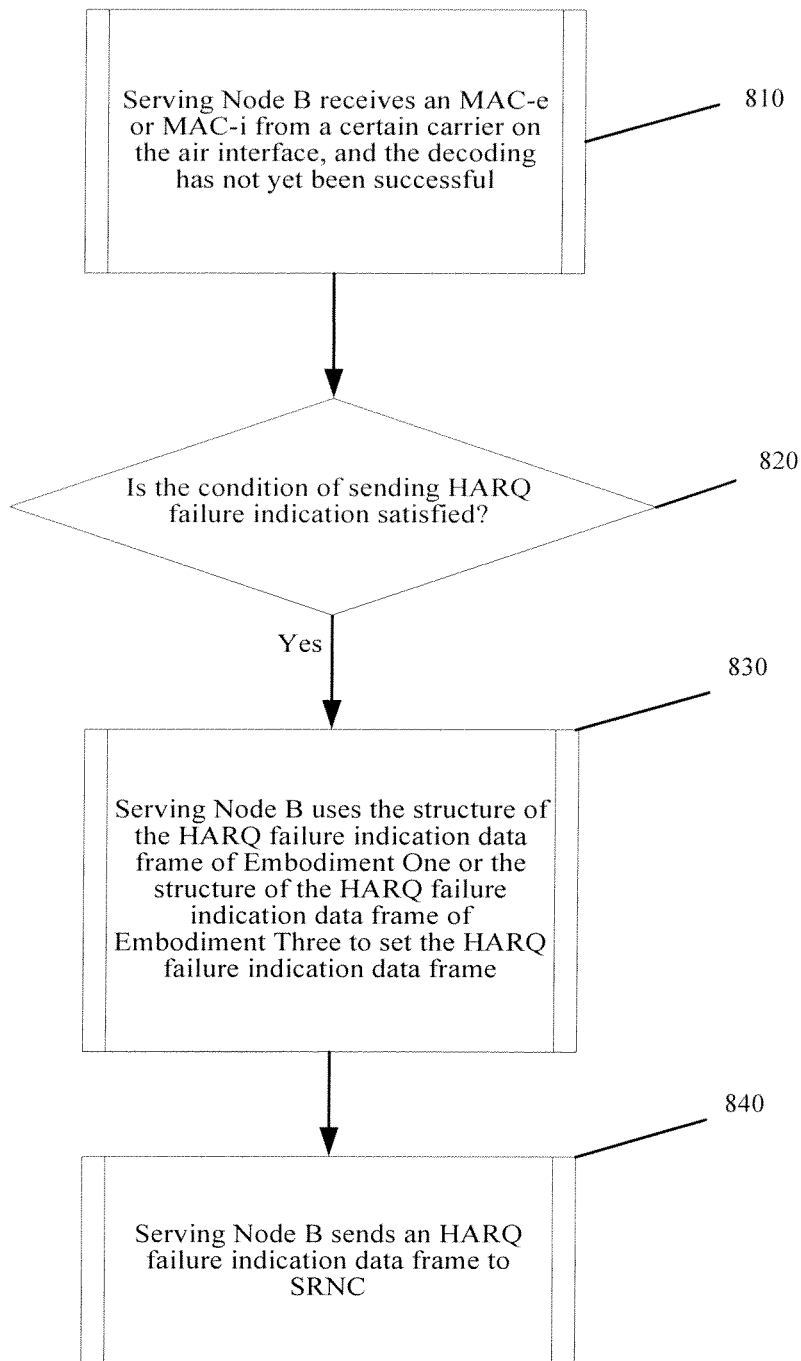
FIG. 8 is the flow chart of Embodiment Five.
Figure 9:
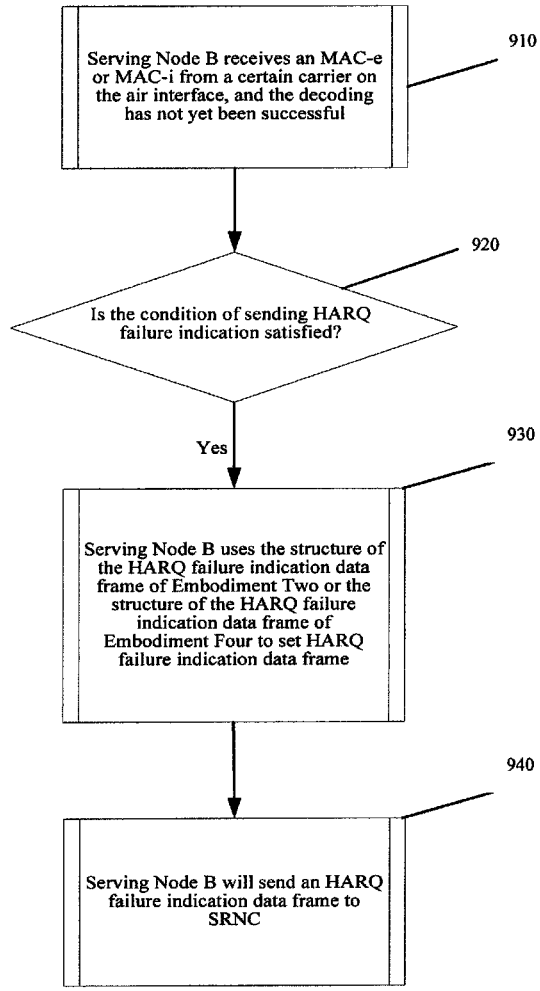
FIG. 9 is the flow chart of Embodiment Six.

FIG. 8 and FIG. 9 are two embodiments of the above mentioned HARQ failure indication method according to the embodiments of the present invention. The two embodiments will be described respectively hereinafter.

Embodiment Five

In the Embodiment, Serving Node B adopts the structure of the HARQ failure indication data frame described in Embodiment One or in Embodiment Three above to carry the carrier identifier.

FIG. 8 is the flow chart of the present embodiment. As shown in FIG. 8, the Serving Node B in the present embodiment sending the HARQ failure indication mainly comprises the following Steps.

Step 810: Serving Node B receives an MAC-e or MAC-i from a certain carrier on the air interface, and the decoding of it has not yet been successful.

Step 820: Serving Node B determines whether the condition of sending an HARQ failure indication is satisfied currently; and if Yes, execute Step 830.

Specifically, an MAC-e or MAC-i protocol data unit for an HARQ process of the carrier can not be decoded successfully, and the RSN indicates a new MAC-e or MAC-i protocol data unit transmitted for the same HARQ process on this carrier, and the HARQ retransmission number that had already occurred was equal or higher than the lowest of the maximum HARQ retransmissions values for the terminal's configured MAC-d flows; then execute Step 830.

Or, an MAC-e or MAC-i for an HARQ process on the carrier has not yet been successfully decoded, and the maximum retransmissions for the MAC-d flow with the highest maximum HARQ retransmissions value valid for the terminal connection have occurred, then execute Step 830; or, the maximum retransmissions for the MAC-d flow with the highest maximum HARQ retransmissions value valid for the terminal connection should have occurred in case the HARQ related outband signaling (for example RSN) on the E-DPCCH of the carrier could not be decoded, then execute Step 830.

Or, the Node B knows the timing of the MAC-e or MAC-i Reset in the terminal via higher layer, and determines MAC-e or MAC-i Reset is performed in the terminal, and so that it knows an MAC-e or MAC-i for an HARQ process on the carrier has not yet been successfully decoded; then execute Step 830.

Step 830: Serving Node B sets the HARQ failure indication data frame by using the structure of the HARQ failure indication data frame described in Embodiment One or the structure of the HARQ failure indication data frame described in Embodiment Three. Its coding method is the same as the coding method of correctly decoding the payload, and is described in detail hereinafter.

If Serving Node B receives an MAC-e protocol data unit on the air interface, and the decoding of it has not yet been successful, Node B uses the structure of the HARQ failure indication data frame of Embodiment One above to fill in:

(1) the connection number and the subframe number in the HARQ failure indication data frame when a failure is detected;

(2) the carrier in the carrier indicator field of the HARQ failure indication data frame;

(3) set one bit of the spare field in the original HARQ failure indication data frame as the carrier indicator field; specifically, if the carrier on which the HARQ failure happens is the primary carrier, fill in 0 as the mapped value in the carrier indicator field, and if the carrier is the secondary carrier, fill in 1 as the mapped value in the carrier indicator field;

(3) set the number of MAC-es protocol data units as 0; and (4) set the Information Elements of the number of HARQ retransmission as the Number of HARQ retransmissions that has occurred at the time of failure detected.

Or, if Serving Node B receives an MAC-i protocol data unit on the air interface, and the decoding has not yet been successful, Node B uses the structure of the HARQ failure indication data frame of Embodiment Three to fill in:

(1) the connection number and the subframe number in the HARQ failure indication data frame when a failure is detected;

(2) the carrier on which the HARQ failure happens in the carrier indicator field of the HARQ failure indication data frame;

specifically, if the carrier is the primary carrier, fill in 0 as the mapped value in the carrier indicator field, and if the carrier is the secondary carrier, fill in 1 as the mapped value in the carrier indicator field;

(3) set the number of MAC-is protocol data units as 0; and (4) set the Information Elements of the number of HARQ retransmission as the Number of HARQ retransmissions that has occurred at the time of failure detected.

Step 840: Serving Node B sends an HARQ failure indication data frame to SRNC.

Embodiment Six

The present embodiment adopts the structure of the HARQ failure indication data frame of Embodiment Two above or the structure of the HARQ failure indication data frame of Embodiment Four above to carry the carrier identifier.

FIG. 9 is the flow chart of the present embodiment. As shown in FIG. 9, the Serving Node B in the present embodiment sending the HARQ failure indication mainly comprises the following Steps.

Step 910: Serving Node B receives an MAC-e or MAC-i of a certain carrier on the air interface, and the decoding of it has not yet been successful.

Step 920: Serving Node B determines whether the condition of sending an HARQ failure indication is satisfied currently.

Specifically, an MAC-e or MAC-i protocol data unit for an HARQ process of the carrier can not be decoded successfully, and the RSN indicates a new MAC-e or MAC-i protocol data unit transmitted for the same HARQ process on this carrier, and the HARQ retransmission number that had already occurred was equal or higher than the lowest of the maximum HARQ retransmissions values for the terminal's configured MAC-d flows; then execute Step 930.

Or, an MAC-e or MAC-i for an HARQ process on the carrier has not yet been successfully decoded, and the maximum retransmissions for the MAC-d flow with the highest maximum HARQ retransmissions value valid for the terminal connection have occurred, then execute Step 930; or, the maximum retransmissions for the MAC-d flow with the highest maximum HARQ retransmissions value valid for the terminal connection should have occurred in case the HARQ related outband signaling (for example RSN) on the E-DPCCH of the carrier could not be decoded, then execute Step 930.

Or, the Node B knows the timing of the MAC-e or MAC-i Reset in the terminal via higher layer, and determines MAC-e or MAC-i Reset is performed in the terminal, and so that it knows an MAC-e or MAC-i for an HARQ process on the carrier has not yet been successfully decoded; then execute Step 930.

Step 930: Serving Node B sets the HARQ failure indication data frame by using the structure of the HARQ failure indication data frame described in Embodiment Two above or the structure of the HARQ failure indication data frame described in Embodiment Four above. The coding method is the same as the coding method of correctly decoding the payload, and is described in detail hereinafter.

If Serving Node B receives an MAC-e protocol data unit on the air interface, and the decoding has not yet been successful, Node B uses the structure of the HARQ failure indication data frame of Embodiment Two in the present invention to fill in:

(1) the connection number and the subframe number in the HARQ failure indication data frame when a failure is detected;

(2) the carrier identifier of the carrier that a failure is detected in the carrier indicator field of the HARQ failure indication data frame;

set one bit of the spare extension field in the original HARQ failure indication data frame as the carrier indicator field; if the carrier detected is the primary carrier, fill in 0 as the mapped value in the carrier indicator field, and if the carrier is the secondary carrier, fill in 1 as the mapped value in the carrier indicator field;

(3) set the number of MAC-es protocol data units as 0; and (4) set the Information Elements of the number of HARQ retransmission as the Number of HARQ retransmissions that has occurred at the time of failure detected, Or if Serving Node B receives an MAC-i protocol data unit on the air interface, and the decoding has not yet been successful, Node B uses the structure of the HARQ failure indication data frame of Embodiment Four above to fill in:

(1) the connection number and the subframe number in the HARQ failure indication data frame when a failure is detected;

(2) the carrier identifier of the detected carrier in the carrier indicator field of the HARQ failure indication data frame;

set one bit of the spare extension field in the original HARQ failure indication data frame as the 'carrier indicator" field; if the carrier is the primary carrier, fill in 0 as the mapped value in the "carrier indicator" field. If the carrier is the secondary carrier, fill in 1 as the mapped value in the "carrier indicator" field;

(3) set the number of MAC-is protocol data units as 0; and (4) set the Information Elements of the number of HARQ retransmission as the Number of HARQ retransmissions that has occurred at the time of failure detected.

Step 940: Serving Node B will send an HARQ failure indication data frame to SRNC.

According the embodiments of the present invention, a receiving method of the HARQ failure indication is also provided.

Figure 10:
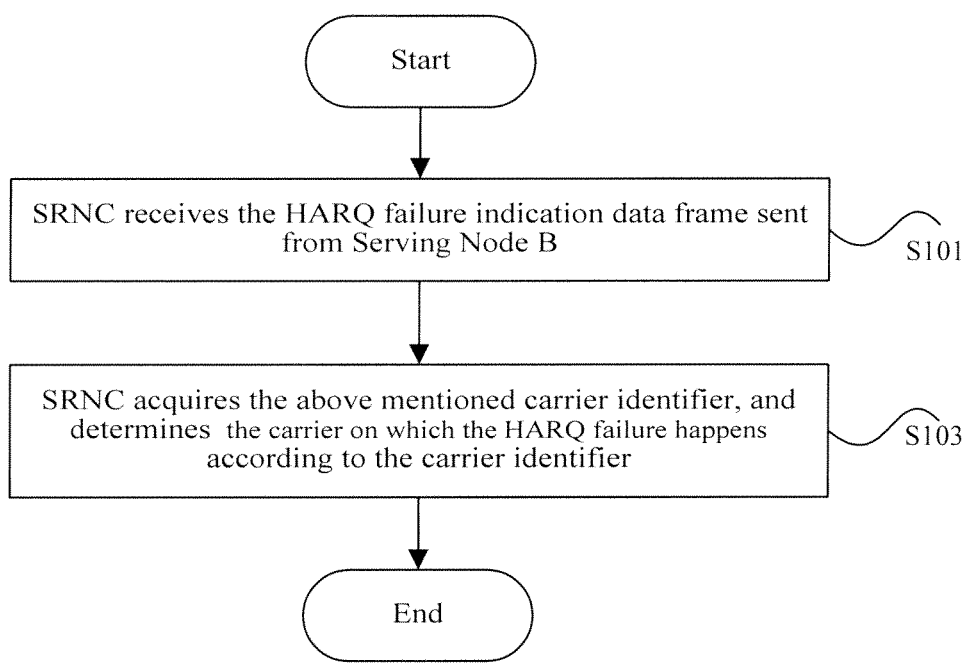
FIG. 10 is a flow chart for the receiving method of the HARQ failure indication according to the embodiments of the present invention.

FIG. 10 is a flow chart of the HARQ failure indication receiving method according to the embodiments of the present invention. As shown in FIG. 10, the receiving method of the HARQ failure indication according to the embodiments of the present invention mainly comprises the following steps.

Step S101: SRNC receives the HARQ failure indication data frame sent from Serving Node B, wherein, the HARQ failure indication data frame carries a carrier identifier which indicates the carrier on which the HARQ failure happens.

Step S103: SRNC acquires the above mentioned carrier identifier, and determines the carrier on which the HARQ failure happens according to the carrier identifier.

Figure 11:
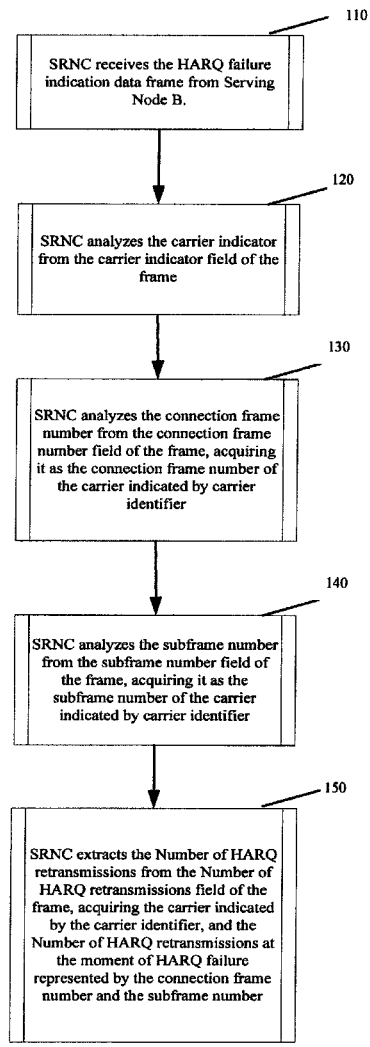
FIG. 11 is a flow chart for realizing in detail the receiving method of the HARQ failure indication according to the embodiments of the present invention.

FIG. 11 is a flow chart of realizing receiving method of the HARQ failure indication according to the embodiments of the present invention. As shown in FIG. 11, the receiving method of the HARQ failure indication according to the embodiments of the present invention can be realized by the following Steps.

Step 110: SRNC receives the HARQ failure indication data frame from Serving Node B.

Step 120: SRNC analyzes the carrier identifier from the carrier indicator field of the frame.

Step 130: SRNC analyzes the connection frame number from the connection frame field of number of the frame, acquiring it as the connection frame number of the carrier indicated by the carrier identifier.

Step 140: SRNC analyzes the subframe number from the subframe field of number of the frame, acquiring it as the subframe number of the carrier indicated by the carrier identifier.

Step 150: SRNC analyzes the Number of HARQ retransmissions from the Number of HARQ retransmissions field of the frame, acquiring it as the Number of HARQ retransmissions of the carrier indicated by the carrier identifier at the moment of HARQ failure represented by the connection frame number and the subframe number.

According to the embodiments of the present invention, a Serving Node B is also provided.

Figure 12:
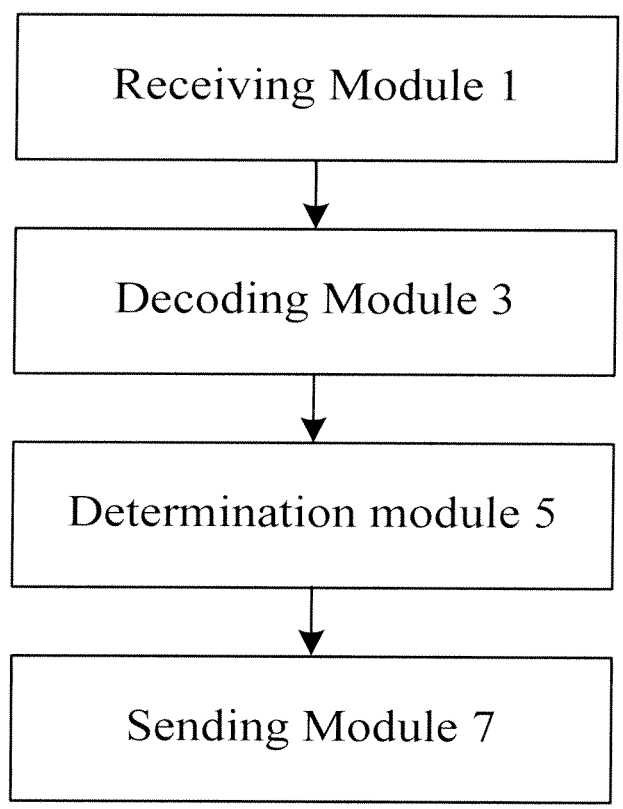
FIG. 12 is the structure diagram of Serving Node B according the embodiments of the present invention.

FIG. 12 is the structure diagram of the Serving Node B according to the embodiments of the present invention. As shown in FIG. 12, the Serving Node B according to the embodiments of the present invention mainly comprises: a Receiving Module 1, a Decoding Module 3, a Determination module 5, and a Sending Module 7, wherein, the Receiving Module 1 is adapted to receive E-DCH data frame; the Decoding Module 3 is connected with the Receiving Module 1 and adapted to decode the E-DCH data frame received by the Receiving Module 1, and trigger the Determination module 5 when the decoding is unsuccessful; the Determination module 5 is connected with the Decoding Module 3 and adapted to determine whether the predetermined condition of sending an HARQ failure indication is satisfied; the Sending Module 7 is connected with the Determination module 5 and adapted to send the HARQ failure indication data frame to SRNC when the Determination module 5 determines that the condition of sending an HARQ failure indication is satisfied, wherein, a carrier identifier which indicates the carrier on which the HARQ failure happens is carried in the HARQ failure indication data frame.

Although the embodiments of the present invention take the Dual-carrier system as the example, the technical solution provided by the embodiments of the present invention can also be applied to other multi-carrier systems.

As described above, with the help of the technical solution provided by the embodiments of the present invention, and through the HARQ failure indication data frame structure, Serving Node B can carry the HARQ error indication corresponding to each carrier, and sends the HARQ failure indication data frame to SRNC by the Iub interface/Iur interface. Thus SRNC can acquire the Number of HARQ retransmissions at the moment of HARQ failure on each carrier, control the SIR target value better through the carrier-based OLPC function, and further avoid HARQ failure caused by the SIR Target being in low value for a long time. In addition, the embodiments of the present invention have few alterations over the existing protocols, and have backward compatibility.

The foregoing description is the only preferred embodiments of the present invention, and should not constitute limitation on the present invention. As for those skilled in the art, the present invention can have various modifications and changes. Any modification, equivalent replacement, and improvement etc. within the principle and spirit of the present invention should be included in the protection scope of the present invention.

We claim:

1. A hybrid automatic repeat request (HARQ) failure indication method, which is used in a dual-carrier system to indicate HARQ failures, wherein the method comprises: when decoding of a received enhanced dedicated transport channel (E-DCH) data frame is unsuccessful and a condition of sending an HARQ failure indication is satisfied currently, a serving node B sending an HARQ failure indication data frame to a service radio network controller (SRNC), wherein, a carrier identifier which indicates a carrier on which the HARQ failure happens is carried in the HARQ failure indication data frame; wherein parameters carried in the HARQ failure indication data frame also comprise: a connection frame number, a subframe number and the number of HARQ retransmissions at the time of HARQ failure on the carrier; wherein the serving node B carries the carrier identifier in the HARQ failure indication data frame in the way of: the serving node B carrying the carrier identifier by a carrier indicator field of the HARQ failure indication data frame, wherein, the carrier indicator field is located at any spare field of the HARQ failure indication data frame or at a spare extension of the HARQ failure indication data frame.

2. The method according to claim 1, wherein after the serving node B sends the HARQ failure indication data frame to the SRNC, the method also comprises:
   the SRNC receiving the HARQ failure indication data frame sent from the serving node B;
   the SRNC acquires the carrier identifier from the carrier indicator field of the HARQ failure indication data frame; and
   the SRNC determines the carrier on which the HARQ failure happens according to the carrier identifier.

3. The method according to claim 1, wherein the structure type of the HARQ failure indication data frame is E-DCH data frame Type 1 or E-DCH data frame Type 2.

4. A HARQ failure indication data frame, the structure type of which is E-DCH data frame Type 1 or E-DCH data frame Type 2, wherein the HARQ failure indication data frame comprises:
   a carrier indicator field which indicates a carrier on which the HARQ failure happens;
   wherein the HARQ failure indication data frame also comprises: a connection frame number field, a subframe number field and a number of HARQ retransmissions field;
   wherein the carrier indicator field is located at any spare field of the HARQ indication data frame or a spare extension field of the HARQ indication data frame.

5. The HARQ failure indication data frame according to claim 4, wherein the HARQ failure indication data frame also comprises:
   a field of number of medium access control-enhanced sublayer protocol data units (MAC-es PDU) or a field of number of medium access control-improved sublayer protocol data units (MAC-is PDU).

6. A receiving method of an HARQ failure indication, comprising:
   a SRNC receiving an HARQ failure indication data frame sent from a serving node B, wherein, the HARQ failure indication data frame carries a carrier identifier which indicates a carrier on which the HARQ failure happens; and the SRNC acquiring the carrier identifier, and determining the carrier on which the HARQ failure happens according to the carrier identifier;

wherein parameters carried in the HARQ failure indication data frame also comprise: a connection frame number, a subframe number and the number of HARQ retransmissions at the time of HARQ failure on the carrier;

wherein the serving node B carries the carrier identifier in the HARQ failure indication data frame in the way of: the serving node B carrying the carrier identifier by a carrier indicator field of the HARQ failure indication data frame, wherein, the carrier indicator field can be located at any spare field of the HARQ failure indication data frame or at a spare extension of the HARQ failure indication data frame.

7. A serving node B, comprising:

a receiving module, adapted to receive an E-DCH data frame;

a decoding module, adapted to decode the E-DCH data frame received by the receiving module, and trigger a determination module when the decoding is unsuccessful;

the determination module, adapted to determine weather a predetermined condition of sending an HARQ failure indication is satisfied currently; and a sending module, adapted to send an HARQ failure indication data frame to a SRNC when the determination module determines that the condition of sending an HARQ failure indication is satisfied, wherein, a carrier identifier which indicates a carrier on which the HARQ failure happens is carried in the HARQ failure indication data frame;

wherein parameters carried in the HARQ failure indication data frame also comprise: a connection frame number, a subframe number and the number of HARQ retransmissions at the time of HARQ failure on the carrier wherein the serving node B carries the carrier identifier in the HARQ failure indication data frame in the way of: the serving node B carrying the carrier identifier by a carrier indicator field of the HARQ failure indication data frame, wherein, the carrier indicator field can be located at any spare field of the HARQ failure indication data frame or at a spare extension of the HARQ failure indication data frame.

8. The method according to claim 1, wherein the structure type of the HARQ failure indication data frame is E-DCH data frame Type 1 or E-DCH data frame Type 2.

9. The method according to claim 2, wherein the structure type of the HARQ failure indication data frame is E-DCH data frame Type 1 or E-DCH data frame Type 2.

10. The method according to claim 1, wherein the structure type of the HARQ failure indication data frame is E-DCH data frame Type 1 or E-DCH data frame Type 2.

* * * * *